(12) United States Patent
Yu et al.

(10) Patent No.: US 11,191,075 B2
(45) Date of Patent: Nov. 30, 2021

(54) DATA TRANSMISSION METHOD, DEVICE, AND COMMUNICATIONS SYSTEM

(71) Applicant: HUAWEI TECHNOLOGIES CO., LTD., Shenzhen (CN)

(72) Inventors: Feng Yu, Beijing (CN); Xin Xiong, Beijing (CN); Haifeng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 16/517,689

(22) Filed: Jul. 22, 2019

(65) Prior Publication Data

US 2019/0349932 A1  Nov. 14, 2019

Related U.S. Application Data

(63) Continuation of application No. PCT/CN2018/073588, filed on Jan. 22, 2018.

(30) Foreign Application Priority Data

Jan. 22, 2017  (CN) .......................... 201710045588.6

(51) Int. Cl.
*H04W 4/00* (2018.01)
*H04W 72/04* (2009.01)
(Continued)

(52) U.S. Cl.
CPC ....... *H04W 72/0453* (2013.01); *H04L 1/1819* (2013.01); *H04L 5/0082* (2013.01);
(Continued)

(58) Field of Classification Search
None
See application file for complete search history.

(56) References Cited

U.S. PATENT DOCUMENTS

| 2011/0105069 A1* | 5/2011 | Gaal | H04W 76/28 455/226.1 |
| 2012/0039227 A1 | 2/2012 | Chen et al. | |

(Continued)

FOREIGN PATENT DOCUMENTS

| CN | 101932027 A | 12/2010 |
| CN | 103945538 A | 7/2014 |

(Continued)

OTHER PUBLICATIONS

R1-1611398 CATT: "UL grant-free transmission for URLLC", 3GPP TSG RAN WG1 Meeting #87, Reno, USA Nov. 14-18, 2016, total 6 pages.

(Continued)

*Primary Examiner* — Phirin Sam
(74) *Attorney, Agent, or Firm* — Rimon PC

(57) ABSTRACT

A data transmission method includes: sending, by a network device, first configuration information to a terminal device, where the first configuration information includes first carrier configuration information and first time configuration information, the first carrier configuration information indicates at least one carrier configured by the network device for a bearer or a logical channel for performing hybrid automatic repeat request, and the first time configuration information indicates a first transmission time unit bundling quantity corresponding to each of the at least one carrier; and sending or receiving, by the network device, data corresponding to the bearer or the logical channel based on the first carrier configuration information and/or the first time configuration information. The data transmission method facilitates low-latency and high-reliability transmission and improves resource utilization.

20 Claims, 4 Drawing Sheets

(51) Int. Cl.
  *H04W 76/27* (2018.01)
  *H04L 1/18* (2006.01)
  *H04L 5/00* (2006.01)
  *H04W 80/02* (2009.01)

(52) U.S. Cl.
  CPC ......... *H04W 72/042* (2013.01); *H04W 76/27* (2018.02); *H04W 80/02* (2013.01)

(56) References Cited

U.S. PATENT DOCUMENTS

| | | | |
|---|---|---|---|
| 2012/0140652 A1* | 6/2012 | Pan | H04B 7/15592 370/252 |
| 2013/0016690 A1* | 1/2013 | Jeong | H04W 24/10 370/329 |
| 2015/0180619 A1 | 6/2015 | Majjigi et al. | |
| 2015/0180623 A1* | 6/2015 | Kim | H04W 72/1289 370/241 |
| 2015/0222402 A1* | 8/2015 | Ouchi | H04W 72/0413 370/329 |
| 2015/0288504 A1* | 10/2015 | Fong | H04L 27/26 370/252 |
| 2016/0073442 A1* | 3/2016 | Koskinen | H04W 76/15 370/329 |
| 2018/0213499 A1* | 7/2018 | Lee | H04W 4/40 |
| 2018/0242317 A1* | 8/2018 | Marinier | H04W 72/0446 |
| 2019/0223197 A1* | 7/2019 | Shin | H04W 72/042 |
| 2020/0187170 A1* | 6/2020 | Shin | H04W 4/70 |
| 2021/0058951 A1* | 2/2021 | Pelletier | H04W 92/10 |

FOREIGN PATENT DOCUMENTS

| | | |
|---|---|---|
| CN | 104348581 A | 2/2015 |
| CN | 105900371 A | 8/2016 |
| JP | 2015122740 A | 7/2015 |
| RU | 2605472 C2 | 12/2016 |
| WO | 2015111891 A1 | 7/2015 |
| WO | 2016109680 A1 | 7/2016 |
| WO | 2016160330 A1 | 10/2016 |

OTHER PUBLICATIONS

ZTE et al.,"Basic Grant-free Transmission for URLLC",3GPP TSG RAN WG1 AH NR Meeting,R1-1700253,Spokane, USA, Jan. 16-20, 2017, total 5 pages.

* cited by examiner

DATA TRANSMISSION METHOD, DEVICE, AND COMMUNICATIONS SYSTEM

CROSS-REFERENCE TO RELATED APPLICATIONS

This application is a continuation of International Application No. PCT/CN2018/073588, filed on Jan. 22, 2018, which claims priority to Chinese Patent Application No. 201710045588.6, filed on Jan. 22, 2017. The disclosures of the aforementioned applications are hereby incorporated by reference in their entireties.

TECHNICAL FIELD

Embodiments of this application relate to the communications field, and more specifically, to a data transmission method, a device, and a communications system.

BACKGROUND

Hybrid automatic repeat request (Hybrid Automatic Repeat Request, HARQ) is a combination of forward error correction (Forward Error Correction, FEC) and automatic repeat request (Automatic Repeat Request, ARQ).

An erroneous data packet cannot be correctly decoded, but still includes useful information. Therefore, through HARQ with soft combining (HARQ with soft combining), the received erroneous data packet is saved in an HARQ buffer, and is combined with a subsequently received retransmission data packet, so that a data packet more reliable than that obtained through independent decoding is obtained. Then, a combined data packet is decoded (soft combining). If decoding still fails, retransmission is requested again, and soft combining is performed again. Based on whether bit information of retransmission is the same as that of original transmission, the HARQ with soft combining is classified into two types, namely, repeated sending of same data (Chase Combining) and incremental redundancy (Incremental Redundancy, IR). In the chase combining, bit information of retransmission is the same as that of original transmission; and in the incremental redundancy, bit information of retransmission does not need to be the same as that of original transmission. An incremental redundancy mechanism is used in a long term evolution (Long Term Evolution, LTE) system.

In the IR, each retransmission does not need to be the same as initial transmission. On the contrary, a plurality of coded bit (coded bit) sets are generated, and each set carries same information. Whenever retransmission is required, a coded bit set different from a previous one is usually transmitted, and a receive end combines retransmitted data with previously transmitted data. A coded bit set of each retransmission is referred to as a redundancy version (Redundancy Version, RV).

An HARQ function crosses both a physical layer and a media access control (Medium Access Control, MAC) layer. A transmit end generates different RVs (the MAC layer informs the physical layer of an RV that is selected) and the physical layer is responsible for soft combining of the receive end. At the receive end, the HARQ buffer is usually located at the physical layer because the physical layer needs to perform soft combining and decoding processing on received data. HARQ operations of the transmit end include: transmitting and retransmitting a transport block (Transport Block, TB), and receiving and processing an ACK/NACK; and HARQ operations of the receive end include: receiving a TB, performing soft combining processing, and generating an ACK/NACK.

To improve reliability and reduce latency, the concept of transmission time interval bundling (TTI bundling) is introduced in LTE. The TTI bundling technology enables a same TB to be sent for a plurality of times in a plurality of consecutive subframes without need of waiting for an ACK/NACK of each intermediate TTI. A probability of erring when a plurality of RVs are received continuously and soft combining processing is performed on the RVs is evidently lower than that of erring when one RV is processed.

To satisfy requirements of a downlink peak rate of 1 Gbp/s and an uplink peak rate of 500 Mbp/s in LTE-A, a maximum transmission bandwidth 100 MHz needs to be provided. However, a carrier aggregation solution is proposed in LTE-A because a continuous frequency spectrum of such a large bandwidth is scarce. In carrier aggregation (Carrier Aggregation, CA), two or more component carriers (Component Carrier, CC) are aggregated together to support a larger transmission bandwidth (whose maximum value is 100 MHz).

In LTE, each terminal device has only one HARQ entity in a non-carrier aggregation scenario. In carrier aggregation, all component carriers have respective HARQ entities. Current carrier aggregation does not support TTI bundling. In a carrier aggregation scenario, sending and receiving on each component carrier are independently scheduled by a cell corresponding to the carrier, and are not necessarily associated with data of another component carrier.

The TTI bundling is supported in only the non-carrier aggregation scenario. If the TTI bundling has an excessively large length, latency is relatively large; or if the TTI bundling has an excessively small length, a quantity of repeated redundancy versions is excessively small, and reliability is reduced. Neither can satisfy a requirement of ultra-reliable and low latency communication (Ultra-reliable And Low Latency Communication, URLLC). Additionally, a terminal device transmits data of any logic channel through TTI bundling. For some services that do not require low latency and high reliability, resources are wasted.

SUMMARY

Embodiments of the present disclosure provide a data transmission method, a device, and a communications system, to implement low-latency and high-reliability transmission and improve resource utilization.

According to a first aspect, a data transmission method is provided. The method includes: sending, by a network device, first configuration information to a terminal device, where the first configuration information includes first carrier configuration information and first time configuration information, the first carrier configuration information indicates at least one carrier configured by the network device for a bearer or a logical channel for performing hybrid automatic repeat request HARQ, and the first time configuration information indicates a first transmission time unit bundling quantity corresponding to each of the at least one carrier; and sending or receiving, by the network device, data corresponding to the bearer or the logical channel based on the first carrier configuration information and/or the first time configuration information.

With reference to the first aspect, in a first possible implementation of the first aspect, the sending or receiving data corresponding to the bearer or the logical channel includes: sending or receiving, by the network device, different redundancy versions of the same data based on the first carrier configuration information and/or the first time configuration information.

With reference to the first aspect or the first possible implementation of the first aspect, in a second possible implementation of the first aspect, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the first configuration information further includes indication information, where the indication information is used to instruct the bearer or the logical channel to perform grant free transmission.

In some possible implementations, the first configuration information further includes a modulation and coding scheme MCS used when grant free transmission is performed on each carrier.

Based on the data transmission method according to this embodiment of this disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

With reference to any one of the first aspect and the first and the second possible implementations of the first aspect, in a third possible implementation of the first aspect, the first configuration information is a radio resource control RRC configuration message, downlink control information DCI, or a media access control control element MAC CE.

With reference to the first aspect or the first possible implementation of the first aspect, in a fourth possible implementation of the first aspect, the method further includes: sending, by the network device, second configuration information to the terminal device, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity; and the sending or receiving data corresponding to the bearer or the logical channel includes: sending or receiving, by the network device, the data corresponding to the bearer or the logical channel based on the second carrier configuration information and/or the second time configuration information.

Based on the data transmission method according to this embodiment of this disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers, thereby implementing low-latency and high-reliability transmission and improving resource utilization.

In some possible implementations, the second configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the second configuration information further includes indication information, where the indication information is used to instruct the bearer or the logical channel to perform grant free transmission.

In some possible implementations, the second configuration information further includes a modulation and coding scheme MCS used when grant free transmission is performed on each carrier.

With reference to the fourth possible implementation of the first aspect, in a fifth possible implementation of the first aspect, the second configuration information is a radio resource control RRC configuration message, downlink control information DCI, or a media access control control element MAC CE.

In some possible implementations, the sending or receiving data corresponding to the bearer or the logical channel includes: sending or receiving, by the network device based on the first configuration information, the data corresponding to the bearer or the logical channel on a transmission time unit within the second transmission time unit bundling quantity corresponding to the at least one carrier, where the first transmission time unit bundling quantity is equal to the second transmission time unit bundling quantity.

With reference to the fourth or the fifth possible implementation of the first aspect, in a sixth possible implementation of the first aspect, the first configuration information or the second configuration information is further used to indicate one piece of the following information: the network device sends or receives a redundancy version of the data corresponding to the bearer or the logical channel on each transmission time unit of each of the at least one carrier; the network device sends or receives a redundancy version of the data corresponding to the bearer or the logical channel on a first transmission time unit of each of the at least one carrier; or the network device sends or receives a redundancy version of the data corresponding to the bearer or the logical channel on a first transmission time unit of a first carrier of the at least one carrier.

With reference to the sixth possible implementation of the first aspect, in a seventh possible implementation of the first aspect, if the first configuration information or the second configuration information indicates that the network device sends or receives the redundancy version of the data corresponding to the bearer or the logical channel on the first transmission time unit of each of the at least one carrier, the network device sends or receives a redundancy version of the data corresponding to the bearer or the logical channel on another transmission time unit of each of the at least one carrier cyclically based on a first predetermined rule; or if the first configuration information or the second configuration information indicates that the network device sends or receives the redundancy version of the data corresponding to the bearer or the logical channel on the first transmission time unit of the first carrier of the at least one carrier, the network device sends or receives a redundancy version of the data corresponding to the bearer or the logical channel on a first transmission time unit of another carrier of the at least one carrier cyclically based on a second predetermined rule.

Based on the data transmission method according to this embodiment of this disclosure, the network device indicates at least one of a plurality of carriers and a transmission time unit bundling quantity corresponding to each carrier, and the network device simultaneously sends redundancy versions of same data on the at least one carrier and a transmission time unit corresponding to each carrier, thereby receiving the redundancy versions in a short time and improving incremental combining reliability.

In some possible implementations, the data corresponding to the bearer or the logical channel is uplink data, and after the network device receives redundancy versions of the data corresponding to the bearer or the logical channel, the method further includes: performing, by the network device, incremental combining on the redundancy versions of the data corresponding to the bearer or the logical channel.

In some possible implementations, the method further includes: sending, by the network device, feedback information to the terminal device based on a result of performing incremental combining on the redundancy versions.

In some possible implementations, the data corresponding to the bearer or the logical channel is downlink data, and after the network device sends redundancy versions of the data corresponding to the bearer or the logical channel, the method further includes: receiving, by the network device, feedback information sent by the terminal device, where the feedback information is used to indicate a result of performing, by the terminal device, incremental combining on the redundancy versions of the data corresponding to the bearer or the logical channel.

With reference to any one of the first aspect and the first to the seventh possible implementations of the first aspect, in an eighth possible implementation of the first aspect, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the network device to receive uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the network device to send downlink data.

According to a second aspect, a data transmission method is provided. The method includes: receiving, by a terminal device, first configuration information sent by a network device, where the first configuration information includes first carrier configuration information and first time configuration information, the first carrier configuration information indicates at least one carrier configured by the network device for a bearer or a logical channel for performing hybrid automatic repeat request HARQ, and the first time configuration information indicates a first transmission time unit bundling quantity corresponding to each of the at least one carrier; and sending or receiving, by the terminal device, data corresponding to the bearer or the logical channel based on the first carrier configuration information and/or the first time configuration information.

With reference to the second aspect, in a first possible implementation of the second aspect, the sending or receiving data corresponding to the bearer or the logical channel includes: sending or receiving, by the terminal device, different redundancy versions of the same data based on the first carrier configuration information and/or the first time configuration information.

With reference to the second aspect or the first possible implementation of the second aspect, in a second possible implementation of the second aspect, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the first configuration information further includes indication information, where the indication information is used to instruct the bearer or the logical channel to perform grant free transmission.

In some possible implementations, the first configuration information further includes a modulation and coding scheme MCS used when grant free transmission is performed on each carrier.

With reference to the second possible implementation of the second aspect, in a third possible implementation of the second aspect, the sending or receiving data corresponding to the bearer or the logical channel includes: selecting, by the terminal device, at least some carriers of the at least one carrier and transmission time unit bundling quantities corresponding to the at least some carriers based on the first configuration information; and sending, by the terminal device, the data corresponding to the bearer or the logical channel on a transmission time unit within the transmission time unit bundling quantities corresponding to the at least some carriers.

Based on the data transmission method according to this embodiment of this disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

With reference to any one of the second aspect and the first and the third possible implementations of the second aspect, in a fourth possible implementation of the second aspect, the first configuration information is a radio resource control RRC configuration message, downlink control information DCI, or a media access control control element MAC CE.

With reference to the second aspect or the first possible implementation of the second aspect, in a fifth possible implementation of the second aspect, the method further includes: receiving, by the terminal device, second configuration information sent by the network device, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity; and the sending or receiving data corresponding to the bearer or the logical channel includes: sending or receiving, by the terminal device, the data corresponding to the bearer or the logical channel based on the second carrier configuration information and/or the second time configuration information.

Based on the data transmission method according to this embodiment of this disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers, thereby implementing low-latency and high-reliability transmission and improving resource utilization.

In some possible implementations, the second configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the second configuration information further includes indication information, where the indication information is used to instruct the bearer or the logical channel to perform grant free transmission.

In some possible implementations, the second configuration information further includes a modulation and coding scheme MCS used when grant free transmission is performed on each carrier.

With reference to the fifth possible implementation of the second aspect, in a sixth possible implementation of the second aspect, the second configuration information is a radio resource control RRC configuration message, downlink control information DCI, or a media access control control element MAC CE.

In some possible implementations, the sending or receiving data corresponding to the bearer or the logical channel includes: sending or receiving, by the terminal device based on the first configuration information, the data corresponding to the bearer or the logical channel on a transmission time unit within the second transmission time unit bundling quantity corresponding to the at least one carrier, where the first transmission time unit bundling quantity is equal to the second transmission time unit bundling quantity.

With reference to the fifth or the sixth possible implementation of the second aspect, in a seventh possible implementation of the second aspect, the first configuration information or the second configuration information further indicates one piece of the following information: the terminal device sends or receives a redundancy version of the data corresponding to the bearer or the logical channel on each transmission time unit of each of the at least one carrier; the terminal device sends or receives a redundancy version of the data corresponding to the bearer or the logical channel on a first transmission time unit of each of the at least one carrier; or the terminal device sends or receives a redundancy version of the data corresponding to the bearer or the logical channel on a first transmission time unit of a first carrier of the at least one carrier.

With reference to the seventh possible implementation of the second aspect, in an eighth possible implementation of the second aspect, if the first configuration information or the second configuration information indicates that the terminal device sends or receives the redundancy version of the data corresponding to the bearer or the logical channel on the first transmission time unit of each of the at least one carrier, the terminal device sends or receives a redundancy version of the data corresponding to the bearer or the logical channel on another transmission time unit of each of the at least one carrier cyclically based on a first predetermined rule; or if the first configuration information or the second configuration information indicates that the terminal device sends or receives the redundancy version of the data corresponding to the bearer or the logical channel on the first transmission time unit of the first carrier of the at least one carrier, the terminal device sends or receives a redundancy version of the data corresponding to the bearer or the logical channel on the first transmission time unit of another carrier of the at least one carrier cyclically based on a second predetermined rule.

Based on the data transmission method according to this embodiment of this disclosure, the network device indicates at least one of a plurality of carriers and a transmission time unit bundling quantity corresponding to each carrier, and the terminal device simultaneously sends redundancy versions of same data on the at least one carrier and a transmission time unit corresponding to each carrier, thereby receiving the redundancy versions in a short time and improving incremental combining reliability.

In some possible implementations, the data corresponding to the bearer or the logical channel is uplink data, and after the terminal device sends the data corresponding to the bearer or the logical channel, the method further includes: receiving, by the terminal device, feedback information sent by the network device, where the feedback information is used to indicate a result of performing, by the network device, incremental combining on the redundancy versions of the data corresponding to the bearer or the logical channel.

In some possible implementations, the data corresponding to the bearer or the logical channel is downlink data, and after the terminal device receives the data corresponding to the bearer or the logical channel, the method further includes: performing, by the terminal device, incremental combining on the redundancy versions of the data corresponding to the bearer or the logical channel.

In some possible implementations, the method further includes: sending, by the terminal device, feedback information to the network device based on a result of performing incremental combining on the redundancy versions.

With reference to any one of the second aspect and the first to the eighth possible implementations of the second aspect, in a ninth possible implementation of the second aspect, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the terminal device to send uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the terminal device to receive downlink data.

According to a third aspect, a data transmission network device is provided. The network device includes: a processing module, configured to determine first configuration information, where the first configuration information includes first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and a transceiver module, configured to send the first configuration information to a terminal device; and the transceiver module is further configured to send or receive, under control of the processing module, data corresponding to the bearer or the logical channel based on the first carrier configuration information and/or the first time configuration information.

With reference to the third aspect, in a first possible implementation of the third aspect, the transceiver module is further configured to send or receive, under control of the processing module, different redundancy versions of the same data based on the first carrier configuration information and/or the first time configuration information.

With reference to the third aspect or the first possible implementation of the third aspect, in a second possible implementation of the third aspect, the first configuration information further includes a grant-free transmission configuration, and the grant-free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the first configuration information further includes indication information, where the indication information is used to instruct the bearer or the logical channel to perform grant free transmission.

In some possible implementations, the first configuration information further includes a modulation and coding scheme MCS used when grant free transmission is performed on each carrier.

Based on the data transmission network device according to this embodiment of this disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

With reference to any one of the third aspect and the first and the second possible implementations of the third aspect, in a third possible implementation of the third aspect, the first configuration information is a radio resource control RRC configuration message, downlink control information DCI, or a media access control control element MAC CE.

With reference to the third aspect or the first possible implementation of the third aspect, in a fourth possible implementation of the third aspect, the processing module is further configured to determine second configuration information, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity; the transceiver module is further configured to send the second configuration information to the terminal device; and the transceiver module is further configured to send or receive, under control of the processing module, data corresponding to the bearer or the logical channel based on the second carrier configuration information and/or the second time configuration information.

Based on the data transmission network device according to this embodiment of this disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers, thereby implementing low-latency and high-reliability transmission and improving resource utilization.

In some possible implementations, the second configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the second configuration information further includes indication information, where the indication information is used to instruct the bearer or the logical channel to perform grant free transmission.

In some possible implementations, the second configuration information further includes a modulation and coding scheme MCS used when grant free transmission is performed on each carrier.

With reference to the fourth possible implementation of the third aspect, in a fifth possible implementation of the third aspect, the second configuration information is a radio resource control RRC configuration message, downlink control information DCI, or a media access control control element MAC CE.

In some possible implementations, the transceiver module is specifically configured to: send or receive, based on the first configuration information, the data corresponding to the bearer or the logical channel on a transmission time unit within the second transmission time unit bundling quantity corresponding to the at least one carrier, where the first transmission time unit bundling quantity is equal to the second transmission time unit bundling quantity.

With reference to the fourth or the fifth possible implementation of the third aspect, in a sixth possible implementation of the third aspect, the first configuration information or the second configuration information is further used to indicate one piece of the following information: the network device sends or receives a redundancy version of the data corresponding to the bearer or the logical channel on each transmission time unit of each of the at least one carrier; the network device sends or receives a redundancy version of the data corresponding to the bearer or the logical channel on a first transmission time unit of each of the at least one carrier; or the network device sends or receives a redundancy version of the data corresponding to the bearer or the logical channel on a first transmission time unit of a first carrier of the at least one carrier.

With reference to the sixth possible implementation of the third aspect, in a seventh possible implementation of the third aspect, if the first configuration information or the second configuration information indicates that the redundancy version of the data corresponding to the bearer or the logical channel is sent or received on the first transmission time unit of each of the at least one carrier, a redundancy version of the data corresponding to the bearer or the logical channel is sent or received on another transmission time unit of each of the at least one carrier cyclically based on a first predetermined rule; or if the first configuration information or the second configuration information indicates that the redundancy version of the data corresponding to the bearer or the logical channel is sent or received on the first transmission time unit of the first carrier of the at least one carrier, a redundancy version of the data corresponding to the bearer or the logical channel is sent or received on a first transmission time unit of another carrier of the at least one carrier cyclically based on a second predetermined rule.

In some possible implementations, the data corresponding to the bearer or the logical channel is uplink data, and the processing module is further configured to perform incremental combining on the redundancy versions of the data corresponding to the bearer or the logical channel.

In some possible implementations, the transceiver module is further configured to send feedback information to the terminal device based on a result of performing incremental combining on the redundancy versions.

In some possible implementations, the data corresponding to the bearer or the logical channel is downlink data, and the transceiver module is further configured to receive feedback information sent by the terminal device, where the feedback information is used to indicate a result of performing, by the terminal device, incremental combining on the redundancy versions of the data corresponding to the bearer or the logical channel.

With reference to any one of the third aspect and the first to the seventh possible implementations of the third aspect, in an eighth possible implementation of the third aspect, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the network device to receive uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the network device to send downlink data.

According to a fourth aspect, a data transmission terminal device is provided. The terminal device includes: a transceiver module, configured to receive first configuration information sent by a network device; and a processing module, configured to decode the first configuration information, where the first configuration information includes first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and the transceiver module is further configured to send or receive, under control of the processing module, data corresponding to the bearer or the logical channel based on the first carrier configuration information and/or the first time configuration information.

With reference to the fourth aspect, in a first possible implementation of the fourth aspect, the transceiver module is further configured to send or receive, under control of the control module, different redundancy versions of the same data based on the first carrier configuration information and/or the first time configuration information.

With reference to the fourth aspect or the first possible implementation of the fourth aspect, in a second possible implementation of the fourth aspect, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the first configuration information further includes indication information, where the indication information is used to instruct the bearer or the logical channel to perform grant free transmission.

In some possible implementations, the first configuration information further includes a modulation and coding scheme MCS used when grant free transmission is performed on each carrier.

With reference to the second possible implementation of the fourth aspect, in a third possible implementation of the fourth aspect, the processing module is further configured to select at least some carriers of the at least one carrier and transmission time unit bundling quantities corresponding to the at least some carriers based on the first configuration information; and the transceiver module is further configured to send the data corresponding to the bearer or the logical channel on a transmission time unit within the transmission time unit bundling quantities corresponding to the at least some carriers.

Based on the data transmission terminal device according to this embodiment of this disclosure, by adding the grant-free transmission configuration to the first configuration information, a minimum value of a quantity of transmission time units is limited, to ensure transmission reliability, and a maximum time interval bundling quantity allowing transmission on a single carrier is limited, to ensure transmission latency.

With reference to any one of the fourth aspect and the first to the third possible implementations of the fourth aspect, in a fourth possible implementation of the fourth aspect, the first configuration information is a radio resource control (RRC) configuration message, downlink control information DCI, or a media access control (MAC) control element MAC CE.

With reference to the fourth aspect or the first possible implementation of the fourth aspect, in a fifth possible implementation of the fourth aspect, the transceiver module is further configured to receive second configuration information sent by the network device; the processing module is further configured to decode the second configuration information, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity; and the transceiver module is further configured to send or receive, under control of the processing module, data corresponding to the bearer or the logical channel based on the second carrier configuration information and/or the second time configuration information.

Based on the data transmission terminal device according to this embodiment of this disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers, thereby implementing low-latency and high-reliability transmission and improving resource utilization.

In some possible implementations, the second configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In some possible implementations, the second configuration information further includes indication information, where the indication information is used to instruct the bearer or the logical channel to perform grant free transmission.

In some possible implementations, the second configuration information further includes a modulation and coding scheme MCS used when grant free transmission is performed on each carrier.

With reference to the fifth possible implementation of the fourth aspect, in a sixth possible implementation of the fourth aspect, the second configuration information is a radio resource control RRC configuration message, downlink control information DCI, or a media access control control element MAC CE.

In some possible implementations, the transceiver module is specifically configured to: send or receive, under control of the processing module and based on the first configuration information, the data corresponding to the bearer or the logical channel on a subframe within the second transmission time unit bundling quantity corresponding to the at least one carrier, where the first transmission time unit bundling quantity is equal to the second transmission time unit bundling quantity.

With reference to the fifth or the sixth possible implementation of the fourth aspect, in a seventh possible implementation of the fourth aspect, the first configuration information or the second configuration information further indicates one piece of the following information: the terminal device sends or receives a redundancy version of the data corresponding to the bearer or the logical channel on each transmission time unit of each of the at least one carrier; the terminal device sends or receives a redundancy version of the data corresponding to the bearer or the logical channel on a first transmission time unit of each of the at least one carrier; or the terminal device sends or receives a redundancy version of the data corresponding to the bearer or the logical channel on a first transmission time unit of a first carrier of the at least one carrier.

With reference to the seventh possible implementation of the fourth aspect, in an eighth possible implementation of the fourth aspect, if the first configuration information or the second configuration information indicates that the terminal device sends or receives the redundancy version of the data corresponding to the bearer or the logical channel on the first transmission time unit of each of the at least one carrier, the terminal device sends or receives a redundancy version of the data corresponding to the bearer or the logical channel on another transmission time unit of each of the at least one carrier cyclically based on a first predetermined rule; or if the first configuration information or the second configuration information indicates that the terminal device receives or sends the redundancy version of the data corresponding to the bearer or the logical channel on the first transmission time unit of the first carrier of the at least one carrier, the terminal device sends or receives a redundancy version of the data corresponding to the bearer or the logical channel on a first transmission time unit of another carrier of the at least one carrier cyclically based on a second predetermined rule.

In some possible implementations, the data corresponding to the bearer or the logical channel is uplink data, and the transceiver module is specifically configured to receive feedback information sent by the network device, where the feedback information is used to indicate a result of performing, by the network device, incremental combining on the redundancy versions of the data corresponding to the bearer or the logical channel.

In some possible implementations, the data corresponding to the bearer or the logical channel is downlink data, and the processing module is specifically configured to perform incremental combining on the redundancy versions of the data corresponding to the bearer or the logical channel.

In some possible implementations, the transceiver module is specifically configured to send feedback information to the network device based on a result of performing incremental combining on the redundancy versions.

With reference to any one of the fourth aspect and the first to the eighth possible implementations of the fourth aspect, in a ninth possible implementation of the fourth aspect, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the terminal device to send uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the terminal device to receive downlink data.

According to a fifth aspect, a network device is provided. The network device includes a processor, a memory, a receiver, and a transmitter. The memory is configured to store an instruction, and the processor is configured to execute the instruction stored in the memory, control the receiver to receive a signal, and control the transmitter to send a signal.

The processor is configured to execute the instruction stored in the memory, so as to perform an operation in the method according to the first aspect or any possible implementation of the first aspect.

According to a sixth aspect, a terminal device is provided. The terminal device includes a processor, a memory, a receiver, and a transmitter. The memory is configured to store an instruction, and the processor is configured to execute the instruction stored in the memory, control the receiver to receive a signal, and control the transmitter to send a signal.

The processor is configured to execute the instruction stored in the memory, so as to perform an operation in the method according to the second aspect or any possible implementation of the second aspect.

According to a seventh aspect, a communications system is provided. The communications system includes the terminal device and the network device according to the foregoing aspects.

According to an eighth aspect, a computer readable storage medium is provided. The computer readable storage medium stores an instruction, and when the instruction is run on a computer, the computer is enabled to perform the method according to the foregoing aspects.

DESCRIPTION OF EMBODIMENTS

The following describes technical solutions of embodiments in this disclosure with reference to accompanying drawings.

Figure 1:
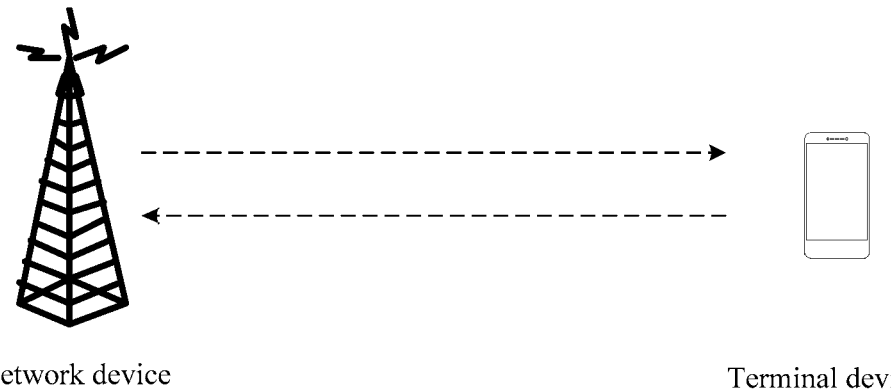
FIG. 1 is a schematic diagram of a scenario to which a technical solution according to an embodiment of the present disclosure is applied.

Embodiments of this disclosure are applicable to a scenario of supporting a plurality of carriers in sending or receiving data. FIG. 1 is a schematic diagram of a scenario to which a technical solution according to an embodiment of this disclosure is applied. As shown in FIG. 1, a network device configures, for a terminal device, at least one of a plurality of carriers on a related bearer or logical channel and a sending or receiving characteristic of a first transmission time unit bundling quantity corresponding to each of the at least one carrier, and the network device sends or receives data of the bearer or the logical channel based on the configuration. The terminal device performs data sending or receiving according to the configuration of the network device for data of a bearer or logical channel.

It should be understood that, the technical solutions in the embodiments of this disclosure may be applied to various communications systems, such as: a global system for mobile communications (Global System of Mobile Communications, GSM) system, a code division multiple access (Code Division Multiple Access, CDMA) system, a wideband code division multiple access (Wideband Code Division Multiple Access, WCDMA) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), and a future 5th-generation (5th-Generation, 5G) communications system, or the like.

This disclosure describes embodiments with reference to a terminal device. The terminal device may also be referred to as user equipment (User Equipment, a terminal device), an access terminal, a subscriber unit, a subscriber station, a mobile station, a mobile console, a remote station, a remote terminal, a mobile device, a user terminal, a terminal, a wireless communication device, a user agent or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or a terminal device in a future evolved public land mobile network (Public Land Mobile Network, PLMN).

This disclosure describes embodiments with reference to a network device. The network device may be a device configured to communicate with the terminal device. For example, the network device may be a combination of a base transceiver station (Base Transceiver Station, BTS) and a base station controller (Base Station Controller, BSC) in a GSM system or in CDMA, may be a NodeB (NodeB, NB) and a radio network controller (Radio Network Controller, RNC) in a WCDMA system, or may be an evolved NodeB (Evolutional Node B, eNB or eNodeB) in an LTE system, or the network device may be a relay station, an access point, an in-vehicle device, a wearable device, an access network device in a future 5G network, for example, a next-generation base station, or an access network device in a future evolved PLMN network.

Figure 2:
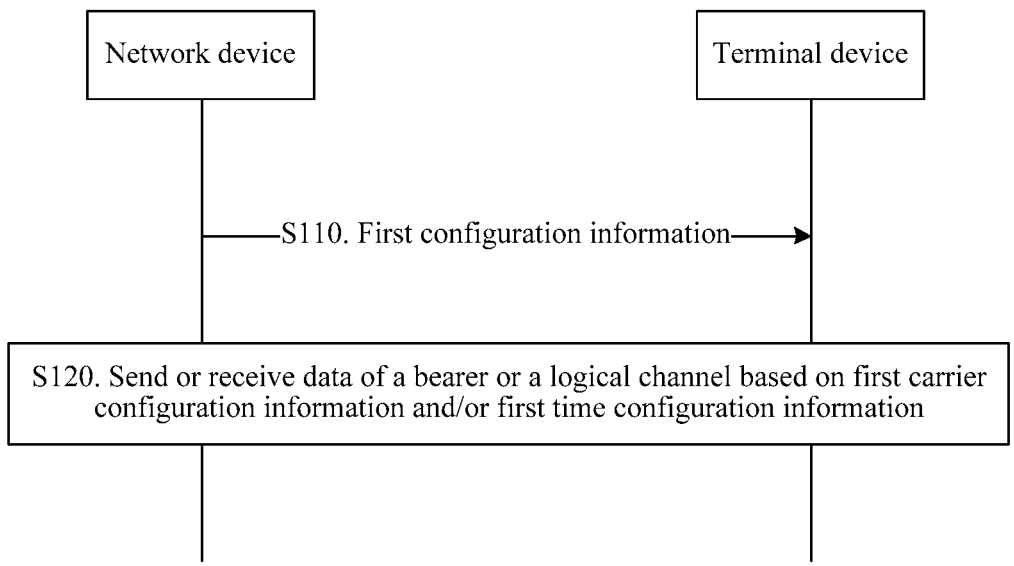
FIG. 2 is a schematic flowchart of a data transmission method according to an embodiment of the present disclosure.

FIG. 2 is a schematic flowchart of a data transmission method according to an embodiment of this application. A network device in FIG. 2 may be the network device in FIG. 1, and a terminal device in FIG. 2 may be the terminal device in FIG. 1. The method includes:

S110. The network device sends first configuration information to the terminal device, where the first configuration information includes first carrier configuration information and first time configuration information.

S120. The network device or the terminal device sends or receives data corresponding to a bearer or a logical channel based on the first carrier configuration information and/or the first time configuration information.

In some embodiments, the network device generates the first configuration information. The first carrier configuration information indicates at least one carrier configured by the network device for the bearer or the logical channel for performing HARQ, and the first time configuration information indicates a first transmission time unit bundling quantity corresponding to each of the at least one carrier.

In one embodiment, the sending or receiving data corresponding to the bearer or the logical channel in S120 includes:

sending or receiving, by the network device or the terminal device, different redundancy versions of the same data based on the first carrier configuration information and/or the first time configuration information.

It should be understood that, the transmission time unit is a minimum scheduling or minimum transmission unit, the transmission time unit may be a TTI or a subframe or may be a slot, and this disclosure is not limited thereto.

It should be further understood that, this embodiment of this disclosure is applicable to a scenario of supporting a plurality of carriers in sending or receiving data. The configuration information may indicate at least one of a plurality of carriers. For example, when 10 carriers are aggregated together to support a larger transmission bandwidth in a carrier aggregation scenario, the first carrier configuration information may indicate four carriers, of the 10 carriers, corresponding to the bearer or the logical channel.

It should be further understood that, the first time configuration information may indicate a transmission time unit bundling quantity corresponding to each carrier. For example, the first carrier configuration information indicates four carriers that are CC1, CC2, CC3, and CC4 respectively. The first time configuration information indicates that first transmission time unit bundling quantities corresponding to CC1, CC2, CC3, and CC4 are 1, 2, 3, and 4 respectively. The first time configuration information may alternatively indicate only one transmission time unit bundling quantity, and then the transmission time unit bundling quantity corresponding to each carrier is the indicated transmission time unit bundling quantity by default. The foregoing example continues to be used, the first time configuration information indicates only one transmission time unit bundling quantity 4, and then the first transmission time unit bundling quantity corresponding to each of CC1, CC2, CC3, and CC4 is 4 by default.

In one embodiment, the first configuration information may be radio resource control (Radio Resource Control, RRC) configuration information, downlink control information (Downlink Control Information, DCI), or a media access control control element (Media Access Control Control Element, MAC CE). For example, when the first configuration information is RRC configuration information, a configuration information element (Information Element, IE) in the RRC configuration information has resource indication information instructing that each bearer or logical channel to send or receive same data, and the resource indication information indicates at least one of a plurality of carriers and a first transmission time unit bundling quantity corresponding to each of the at least one carrier.

For example, data of the bearer or the logical channel corresponds to four carriers that are CC1, CC2, CC3, and CC4 respectively, and transmission time unit bundling quantities on the carriers are 1, 2, 3, and 4 respectively.

In one embodiment, for each bearer or logical channel, the RRC configuration information is used to configure a resource pool during receiving or sending, and the resource pool includes a plurality of carriers and a maximum transmission time unit bundling quantity corresponding to each of the plurality of carriers.

For example, the resource pool of the bearer or the logical channel corresponds to four carriers that are CC1, CC2, CC3, and CC4 respectively, and a transmission time unit bundling quantity on each carrier is 4. During each actual transmission, the network device may dynamically schedule some resources for the terminal device from the resource pool based on a system resource occupancy situation at a current moment. For example, currently scheduled resources are: CC1 uses one transmission time unit, CC2 uses two transmission time units, and CC3 uses three transmission time units.

It should be understood that, in the foregoing example, description is made by using only an example in which the first configuration information indicates four carriers. In an actual data transmission process, the first configuration information may indicate one or more carriers, and a transmission time unit bundling quantity on each carrier may alternatively be not limited to the quantity in the foregoing example.

Figure 3:
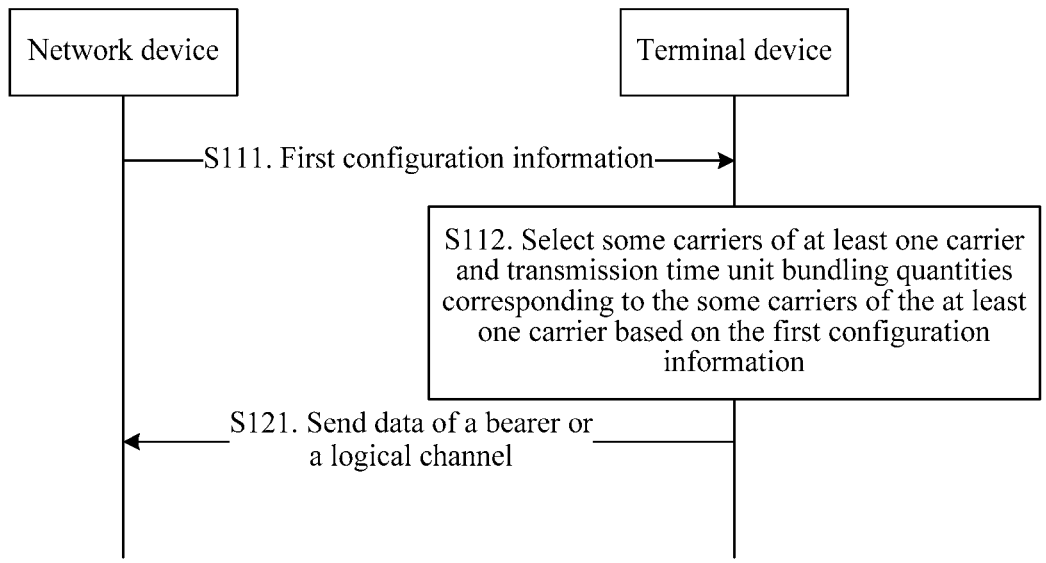
FIG. 3 is another schematic flowchart of a data transmission method according to an embodiment of the present disclosure.

FIG. 3 is a schematic flowchart of a data transmission method according to another embodiment of the present disclosure. As shown in FIG. 3, the data transmission method may further include the following steps.

S111. A network device sends first configuration information to a terminal device, where the first configuration information includes first carrier configuration information, first time configuration information, and a grant free transmission configuration.

S112. The terminal device selects at least some carriers of the at least one carrier and transmission time unit bundling quantities corresponding to the at least some carriers based on the first configuration information.

S121. The terminal device sends the data of the bearer or the logical channel on a transmission time unit within the transmission time unit bundling quantities corresponding to the at least some carriers.

Specifically, in addition to the first carrier configuration information and the first time configuration information, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier. After receiving the first configuration information, the terminal device may select, based on a channel quality measurement result, an appropriate carrier and an appropriate transmission time unit bundling quantity from the at least one carrier and the first transmission time unit bundling quantity corresponding to each of the at least one carrier. The minimum value of the total quantity of transmission time units required each time grant free transmission is performed on the data of the bearer or the logical channel and the maximum value of the bundling quantity of transmission time units allowing transmission on each carrier should satisfy a requirement of the first configuration information.

In one embodiment, the first configuration information further includes indication information, where the indication information is used to instruct the bearer or the logical channel to perform grant free transmission.

In one embodiment, the first configuration information further includes a modulation and coding scheme (Modulation and Coding Scheme, MCS) used when grant-free transmission is performed on each carrier.

In some embodiments, the indication information may be used to perform an explicit indication through 1 bit of the first configuration information. For example, 1 indicates that the bearer or the logical channel is in a grant-free transmission mode, and 0 indicates that the bearer or the logical channel is not in the grant-free transmission mode. It may be understood that, when the indication information indicates that the bearer or the logical channel is not in the grant free transmission manner, the first configuration information does not need to include the foregoing grant-free transmission configuration.

The indication information may be further used to perform an implicit indication based on whether another grant free related parameter is configured for the bearer or the logical channel. For example, if the minimum value of the total quantity of transmission time units required when grant free transmission is performed and the maximum value of the bundling quantity of transmission time units allowing transmission on each carrier are configured for the first configuration information, the network device instructs, in an implicit indication manner, the terminal device to perform grant free transmission. For another example, if the MCS used during grant free transmission is configured for the first configuration information, the network device instructs, in an implicit indication manner, the terminal device to perform grant free transmission. The indication information in this embodiment of this disclosure may include but is not limited to the foregoing examples.

For example, when grant-free transmission is performed on a service of a logical channel, a minimum value of a total quantity of required transmission time units is 6, and a maximum transmission time unit bundling quantity on a single carrier is 2. Therefore, it indicates that each time the service of the logical channel is transmitted, the terminal device needs to select at least three carriers, and a maximum value of a transmission time unit bundling quantity on each carrier is 2.

Based on the data transmission method according to this embodiment of this disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

Figure 4:
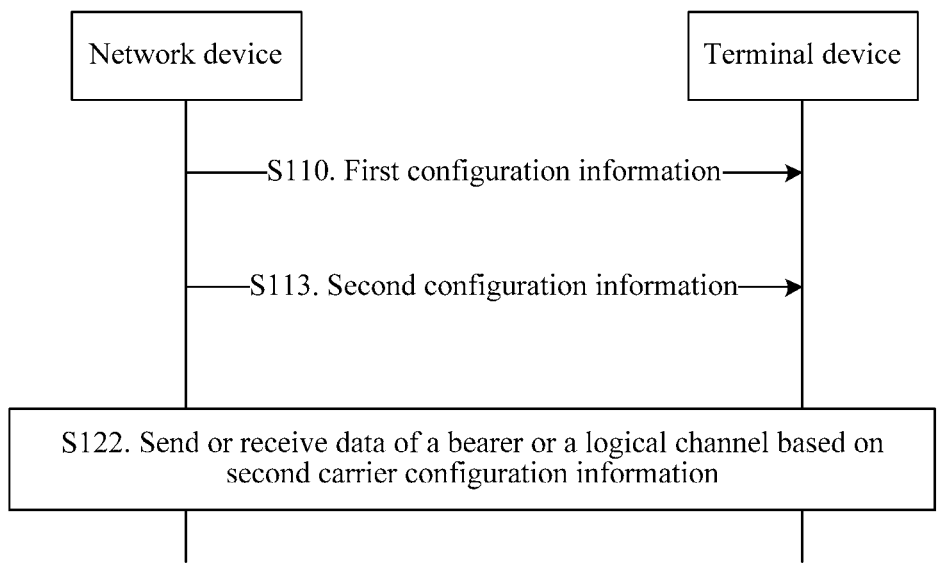
FIG. 4 is still another schematic flowchart of a data transmission method according to an embodiment of the present disclosure.

FIG. 4 is a schematic flowchart of a data transmission method according to still another embodiment of the present disclosure. As shown in FIG. 4, the data transmission method may be performed through the following steps.

S110. A network device sends first configuration information to a terminal device, where the first configuration information includes first carrier configuration information and first time configuration information.

S113. The network device sends second configuration information to the terminal device, where the second configuration information includes second carrier configuration information and/or second time configuration information.

S122. The network device or the terminal device sends or receives, based on the second carrier configuration information, data corresponding to a bearer or a logical channel on at least some carriers of at least one carrier.

Specifically, the first configuration information includes the first carrier configuration information and the first time configuration information that are described in the foregoing embodiment. The network device determines the second configuration information based on the first configuration information, where the second configuration information includes the second carrier configuration information and/or the second time configuration information, the second carrier configuration information indicates the at least some carriers of the at least one carrier, the second time configuration information indicates a second transmission time unit bundling quantity corresponding to each of the at least some carriers, and a first transmission time unit bundling quantity is greater than or equal to the second transmission time unit bundling quantity. The network device sends the second configuration information to the terminal device. The network device or the terminal device sends or receives, based on the second carrier configuration information, the data corresponding to the bearer or the logical channel on the at least some carriers.

In one embodiment, the second configuration information may be a radio resource control RRC configuration message, downlink control information DCI, or a media access control (MAC) control element MAC CE.

In one embodiment, the second configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In one embodiment, the second configuration information further includes indication information, where the indication information is used to instruct the bearer or the logical channel to perform grant free transmission.

In one embodiment, the second configuration information further includes a modulation and coding scheme MCS used when grant free transmission is performed on each carrier.

It should be understood that, the indication information in the second configuration information has a same function as that of the indication information in the foregoing first configuration information, and may be used to perform an explicit indication through 1 bit, or may be used to perform an implicit indication based on whether another grant free related parameter is configured for the bearer or the logical channel. The indication information in this embodiment of the present disclosure may include but is not limited to the foregoing examples.

In some embodiments, after receiving the second configuration information, the terminal device may select, based on a channel quality measurement result, an appropriate carrier and an appropriate transmission time unit bundling quantity from the at least some carriers of the at least one carrier in the second carrier configuration information and second transmission time unit bundling quantities corresponding to the at least some carriers in the second time configuration information. The minimum value of the total quantity of transmission time units required each time grant free transmission is performed on the data of the bearer or the logical channel and the maximum value of the bundling quantity of transmission time units allowing transmission on each carrier should satisfy a requirement of the first configuration information.

In one embodiment, the network device determines, based on the first configuration information, that the second configuration information may be: The network device dynamically schedules some resources for the network device or the terminal device from a resource pool based on the first configuration information and a system resource occupancy situation at a current moment. To be specific, the second configuration information is used to indicate the at least some carriers of the at least one carrier. To be specific, a physical downlink control channel (Physical Downlink Control Channel, PDCCH) dynamically schedules the at least some carriers of the at least one carrier based on each situation in the resource pool.

For example, the data of the bearer or the logical channel corresponds to four carriers, currently scheduled resources may be three or less carriers, and the network device or the terminal device may send or receive, on the three or less of the four carriers, the data corresponding to the bearer or the logical channel.

Based on the data transmission method according to this embodiment of the present disclosure, the at least some carriers of the at least one carrier are indicated through the second carrier configuration information, and the network device simultaneously sends same data on the at least some carriers of the at least one carrier, thereby implementing low-latency and high-reliability transmission and improving resource utilization.

Figure 5:
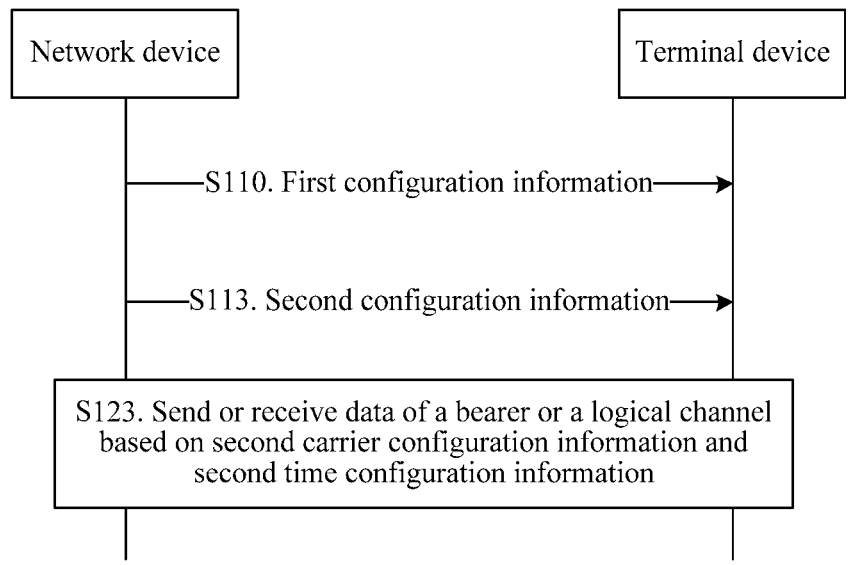
FIG. 5 is still another schematic flowchart of a data transmission method according to an embodiment of the present disclosure.

FIG. 5 is still another schematic flowchart of a data transmission method according to an embodiment of the present disclosure. In one embodiment, as shown in FIG. 5, S122 in which the network device or the terminal device sends or receives, based on the second carrier configuration information, data corresponding to a bearer or a logical channel on at least some carriers of at least one carrier may be further performed through the following step.

S123. The network device or the terminal device sends or receives, based on the second carrier configuration information and the second time configuration information, the data corresponding to the bearer or the logical channel on a transmission time unit within second transmission time unit bundling quantities corresponding to the some carriers of the at least one carrier.

In some embodiments, the second configuration information includes the second carrier configuration information and the second time configuration information, the second carrier configuration information is used to indicate the at least some carriers of the at least one carrier, and the second time configuration information is used to indicate second transmission time unit bundling quantities corresponding to the at least some carriers of the at least one carrier. To be specific, a PDCCH dynamically schedules the some carriers of the at least one carrier and the second transmission time unit bundling quantities corresponding to the at least some carriers of the at least one carrier based on each situation in a resource pool.

For example, when the data of the bearer or the logical channel corresponds to four carriers that are CC1, CC2, CC3, and CC4 respectively, and a transmission time unit bundling quantity on each carrier is 4, currently scheduled resources may be: CC1 uses one transmission time unit, CC2 uses two transmission time units, and CC3 uses three transmission time units. The network device or the terminal device may send or receive the data corresponding to the bearer or the logical channel on the one transmission time unit of CC1, the two transmission time units of CC2, and the three transmission time units of CC3.

In one embodiment, the terminal device has one HARQ entity for a plurality of carriers, and data of the HARQ entity may be sent or received on the plurality of carriers simultaneously, and may be further sent or received on a transmission time unit within a transmission time unit bundling quantity corresponding to each carrier. Both each carrier and a transmission time unit within a transmission time unit bundling quantity in each carrier correspond to a same HARQ process (HARQ process).

It should be understood that, other steps in FIG. 5 are the same as corresponding steps in FIG. 4. For brevity, details are not described herein again.

Based on the data transmission method according to this embodiment of the present disclosure, the at least some carriers of the at least one carrier and the transmission time unit bundling quantities corresponding to the at least some carriers of the at least one carrier are indicated through the second carrier configuration information and the second time configuration information, and the network device simultaneously sends same data on transmission time units corresponding to the at least some carriers of the at least one carrier, thereby implementing low-latency and high-reliability transmission and improving resource utilization. In one embodiment, when the terminal device sends the data of the bearer or the logical channel in uplink, the terminal device sends, based on scheduling of the network device, a redundancy version of the data of the bearer or the logical channel on at least one of the plurality of carriers and a transmission time unit within a transmission time unit bundling quantity corresponding to each of the at least one carrier. If the sending is based on scheduling, only a data resource location on a first carrier may be scheduled, and locations and MCSs of other carriers are the same as those on the first carrier; a resource location and an MCS within a transmission time unit bundling quantity corresponding to each carrier are the same as those on the first carrier; or a resource location and an MCS within a transmission time unit bundling quantity corresponding to each carrier are in a non-adaptive manner, and are the same as a resource location and an MCS of a first transmission time unit of the carrier. If the sending is based on scheduling by using a plurality of carriers separately, HARQ process addresses (HARQ process ID) in scheduling information on the carriers are the same, indicating that same data is sent; or if sending is performed in a contention-based manner, an HARQ process ID may be carried in data.

In one embodiment, the first configuration information or the second configuration information is further used to indicate one piece of the following information:

the network device or the terminal device sends or receives a redundancy version of the data corresponding to the bearer or the logical channel on each transmission time unit of each of the at least one carrier;

the network device or the terminal device sends or receives a redundancy version of the data corresponding to the bearer or the logical channel on the first transmission time unit of each of the at least one carrier; or the network device or the terminal device sends or receives a redundancy version of the data corresponding to the bearer or the logical channel on the first transmission time unit of the first carrier of the at least one carrier.

In one embodiment, the first configuration information or the second configuration information may include redundancy version indication information, where the redundancy version indication information may be used to indicate any one of the foregoing three types of information.

In one embodiment, the first configuration information or the second configuration information indicates that the network device or the terminal device sends or receives the redundancy version of the data corresponding to the bearer or the logical channel on the first transmission time unit of each of the at least one carrier, the network device or the terminal device sends or receives a redundancy version of the data corresponding to the bearer or the logical channel on another transmission time unit of each of the at least one carrier cyclically based on a first predetermined rule; or the first configuration information or the second configuration information indicates that the network device or the terminal device sends or receives the redundancy version of the data corresponding to the bearer or the logical channel on the first transmission time unit of the first carrier of the at least one carrier, the network device or the terminal device sends or receives a redundancy version of the data corresponding to the bearer or the logical channel on a first transmission time unit of another carrier of the at least one carrier cyclically based on a second predetermined rule.

Specifically, a redundancy version of each transmission time unit of each of the at least one carrier may be explicitly indicated by the first configuration information or the second configuration information, that is, the first configuration information or the second configuration information indicates the redundancy version of each transmission time unit of each carrier; the redundancy version of the data corresponding to the bearer or the logical channel sent or received on the first transmission time unit of each of the at least one carrier are explicitly indicated by the first configuration information or the second configuration information indicates, and the network device sends or receives a redundancy version of the data corresponding to the bearer or the logical channel on another transmission time unit of each of the at least one carrier cyclically based on the first predetermined rule; or the redundancy version of the data corresponding to the bearer or the logical channel sent or received on the first transmission time unit of the first carrier of the at least one carrier are explicitly indicated by the first configuration information or the second configuration information indicates, and the network device or the terminal device sends or receives a redundancy version of the data corresponding to the bearer or the logical channel on a first transmission time unit of another carrier of the at least one carrier cyclically based on the second predetermined rule.

In one embodiment, the redundancy version of each transmission time unit of each of the at least one carrier may be obtained through calculation based on a third predetermined rule. For example, for a redundancy version of a first transmission time unit of each carrier, RV(k)=cell index modulo 4, where the cell index is an index number of a cell in which a carrier is located, and the modulo is a modulo operation. Therefore, redundancy versions on other transmission time units within transmission time unit bundling quantities are obtained through cycling in a manner of 0, 2, 3, and 1.

It should be understood that, the first predetermined rule may be that redundancy versions are obtained through cycling in a manner of 0, 2, 3, and 1, and the second predetermined rule may also be that redundancy versions are obtained through cycling in a manner of 0, 2, 3, and 1.

It should be further understood that, the first predetermined rule may be the same as the second predetermined rule, or may be different from the second predetermined rule. Any method for determining, through a redundancy version within a transmission time unit, a redundancy version within another transmission time unit falls within the protection scope of the present disclosure.

In one embodiment, the data corresponding to the bearer or the logical channel is uplink data, and after the network device receives redundancy versions of the data corresponding to the bearer or the logical channel that are sent by the terminal device, the method further includes:

performing, by the network device, incremental combining on the redundancy versions of the data corresponding to the bearer or the logical channel.

In one embodiment, the method further includes:
sending, by the network device, feedback information to the terminal device based on a result of performing incremental combining on the redundancy versions.

In one embodiment, the data corresponding to the bearer or the logical channel is downlink data, and after the network device sends redundancy versions of the data corresponding to the bearer or the logical channel to the terminal device, the method further includes:

performing, by the terminal device, incremental combining on the redundancy versions of the data corresponding to the bearer or the logical channel.

In one embodiment, the method further includes:
receiving, by the network device, feedback information sent by the terminal device, where the feedback information is used to indicate a result of performing, by the terminal device, incremental combining on the redundancy versions of the data corresponding to the bearer or the logical channel.

Figure 6:
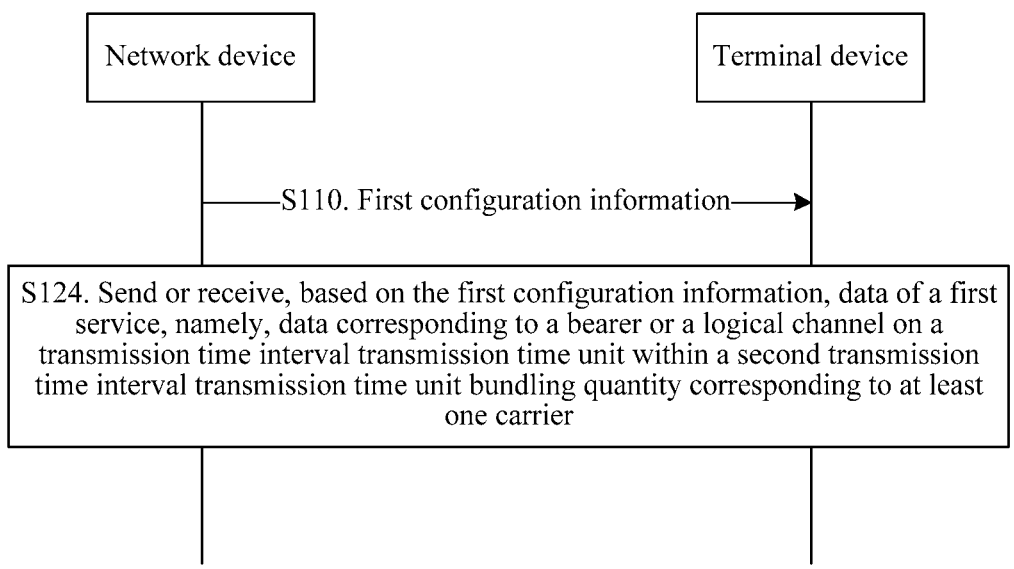
FIG. 6 is still another schematic flowchart of a data transmission method according to an embodiment of the present disclosure.

FIG. 6 is a schematic flowchart of a data transmission method according to still another embodiment of the present disclosure. As shown in FIG. 6, the data transmission method may be performed through the following steps.

S110. A network device sends first configuration information to a terminal device, where the first configuration information includes first carrier configuration information and first time configuration information.

S124. The network device or the terminal device sends or receives, based on the first configuration information, data corresponding to a bearer or a logical channel on a transmission time unit within a second transmission time unit bundling quantity corresponding to at least one carrier, where a first transmission time unit bundling quantity is equal to the second transmission time unit bundling quantity.

For example, the data of the bearer or the logical channel corresponds to four carriers that are CC1, CC2, CC3, and CC4 respectively, and transmission time unit bundling quantities on the carriers are 1, 2, 3, and 4 respectively. The network device or the terminal device may send or receive the data corresponding to the bearer or the logical channel on the one transmission time unit of CC1, the two transmission time units of CC2, the three transmission time units of CC3, and the four transmission time units of CC4.

In one embodiment, the first configuration information is further used to indicate one piece of the following information:

the network device or the terminal device sends or receives a redundancy version of the data corresponding to the bearer or the logical channel on each transmission time unit of each of the at least one carrier;

the network device or the terminal device sends or receives a redundancy version of the data corresponding to the bearer or the logical channel on the first transmission time unit of each of the at least one carrier; or the network device or the terminal device sends or receives a redundancy version of the data corresponding to the bearer or the logical channel on the first transmission time unit of the first carrier of the at least one carrier.

In one embodiment, the first configuration information may include redundancy version indication information, where the redundancy version indication information may be used to indicate any one of the foregoing three types of situations.

In one embodiment, if the first configuration information indicates that the network device or the terminal device sends or receives the redundancy version of the data corresponding to the bearer or the logical channel on the first transmission time unit of each of the at least one carrier, the network device or the terminal device sends or receives a redundancy version of the data corresponding to the bearer or the logical channel on another transmission time unit of each of the at least one carrier cyclically based on a first predetermined rule; or if the first configuration information indicates that the network device or the terminal device sends or receives the redundancy version of the data corresponding to the bearer or the logical channel on the first transmission time unit of the first carrier of the at least one carrier, the network device or the terminal device sends or receives a redundancy version of the data corresponding to the bearer or the logical channel on a first transmission time unit of another carrier of the at least one carrier cyclically based on a second predetermined rule.

It should be understood that, redundancy version information indicated by the first configuration information in FIG. 6 is the same as redundancy version information indicated by the first configuration information or the second configuration information in FIG. 4 or FIG. 5. For brevity, details are not described herein again.

In one embodiment, the plurality of carriers include an uplink carrier set and a downlink carrier set, and the first configuration information further indicates:

the first carrier and a first transmission time unit bundling quantity corresponding to the first carrier, where the first carrier is at least one carrier corresponding to the bearer or the logical channel in the uplink carrier set, and the uplink carrier set is used by the network device to receive uplink data or used by the terminal device to send downlink data; and/or the second carrier and a first transmission time unit bundling quantity corresponding to the second carrier, where the second carrier is at least one carrier corresponding to the bearer or the logical channel in the downlink carrier set, and the downlink carrier set is used by the network device to send downlink data or used by the terminal device to receive uplink data.

It should be understood that, when the terminal device sends data in uplink and receives data in downlink, each resource pool for sending or receiving the data corresponding to the bearer or the logical channel may be configured; and the first carrier and the first transmission time unit bundling quantity corresponding to the first carrier or the first transmission time unit bundling quantity corresponding to the second carrier may alternatively be configured identically, and this application is not limited thereto.

The data transmission methods according to the embodiments of the present disclosure are described in detail above with reference to FIG. 2 through FIG. 6, and a data transmission network device and a data transmission terminal device according to the embodiments of this application are described in detail below with reference to FIG. 7 through FIG. 10.

Figure 7:
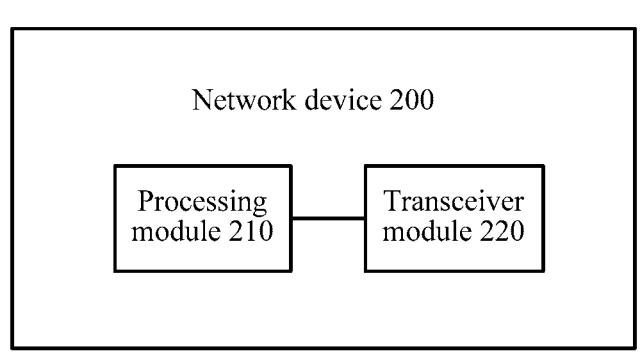
FIG. 7 is a schematic block diagram of a data transmission network device according to an embodiment of the present disclosure.

FIG. 7 is a schematic block diagram of a network device 200 according to an embodiment of the present disclosure. As shown in FIG. 7, the network device 200 includes:

a processing module 210 configured to determine first configuration information, where the first configuration information includes first carrier configuration information and first time configuration information, the first carrier configuration information indicates at least one carrier configured by the network device for a bearer or a logical channel for performing hybrid automatic repeat request HARQ, and the first time configuration information indicates a first transmission time unit bundling quantity corresponding to each of the at least one carrier; and a transceiver module 220 configured to send the first configuration information to a terminal device; and the transceiver module 220 is further configured to send or receive, under control of the processing module 210, data corresponding to the bearer or the logical channel based on the first carrier configuration information and/or the first time configuration information.

In one embodiment, the transceiver module 220 is further configured to send or receive, under control of the processing module 210, different redundancy versions of the same data based on the first carrier configuration information and/or the first time configuration information.

In one embodiment, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In one embodiment, the first configuration information further includes indication information, where the indication information is used to instruct the bearer or the logical channel to perform grant free transmission.

In one embodiment, the first configuration information further includes a modulation and coding scheme MCS used when grant free transmission is performed on each carrier.

Based on the data transmission network device according to this embodiment of the present disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

In one embodiment, the first configuration information is a radio resource control (RRC) configuration message, downlink control information DCI, or a media access control (MAC) control element MAC CE.

In one embodiment, the processing module 210 is further configured to determine second configuration information, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity.

The transceiver module 220 is further configured to send the second configuration information to the terminal device.

The transceiver module 220 is further configured to send or receive, under control of the processing module 210, data corresponding to the bearer or the logical channel based on the second carrier configuration information and/or the second time configuration information.

Based on the data transmission network device according to this embodiment of the present disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers of the at least one carrier, thereby implementing low-latency and high-reliability transmission and improving resource utilization.

In one embodiment, the second configuration information further includes a grant free transmission configuration, and the grant-free transmission configuration includes a minimum value of a total quantity of transmission time units required each time grant free transmission is performed on the bearer or the logical channel and a maximum value of a bundling quantity of transmission time units allowing transmission on each carrier.

In one embodiment, the second configuration information further includes indication information, where the indication information is used to instruct the bearer or the logical channel to perform grant free transmission.

In one embodiment, the second configuration information further includes a modulation and coding scheme MCS used when grant free transmission is performed on each carrier.

In one embodiment, the second configuration information is a radio resource control RRC configuration message, downlink control information DCI, or a media access control (MAC) control element MAC CE.

In one embodiment, the transceiver module 220 is configured to: send or receive, under control of the processing module 210 and based on the first configuration information, the data corresponding to the bearer or the logical channel on a transmission time unit within the second transmission time unit bundling quantity corresponding to the at least one carrier, where the first transmission time unit bundling quantity is equal to the second transmission time unit bundling quantity.

In one embodiment, the first configuration information or the second configuration information is further used to indicate one piece of the following information: the network device sends or receives a redundancy version of the data corresponding to the bearer or the logical channel on each transmission time unit of each of the at least one carrier; the network device sends or receives a redundancy version of the data corresponding to the bearer or the logical channel on a first transmission time unit of each of the at least one carrier; or the network device sends or receives a redundancy version of the data corresponding to the bearer or the logical channel on a first transmission time unit of a first carrier of the at least one carrier.

In one embodiment, if the first configuration information or the second configuration information indicates that the redundancy version of the data corresponding to the bearer or the logical channel is sent or received on the first transmission time unit of each of the at least one carrier, a redundancy version of the data corresponding to the bearer or the logical channel is sent or received on another transmission time unit of each of the at least one carrier cyclically based on a first predetermined rule; or if the first configuration information or the second configuration information indicates that the redundancy version of the data corresponding to the bearer or the logical channel is sent or received on the first transmission time unit of the first carrier of the at least one carrier, a redundancy version of the data corresponding to the bearer or the logical channel is sent or received on a first transmission time unit of another carrier of the at least one carrier cyclically based on a second predetermined rule.

In one embodiment, the data corresponding to the bearer or the logical channel is uplink data, and the processing module 210 is further configured to perform incremental combining on the redundancy versions of the data corresponding to the bearer or the logical channel.

In one embodiment, the processing module 210 is further configured to control, based on a result of performing incremental combining on the redundancy versions, the transceiver module 220 to send feedback information to the terminal device.

In one embodiment, the data corresponding to the bearer or the logical channel is downlink data, and the transceiver module 220 is further configured to receive feedback information sent by the terminal device, where the feedback information is used to indicate a result of performing, by the terminal device, incremental combining on the redundancy versions of the bearer or the logical channel.

In one embodiment, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the network device 200 to receive uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the network device 200 to send downlink data.

Figure 8:
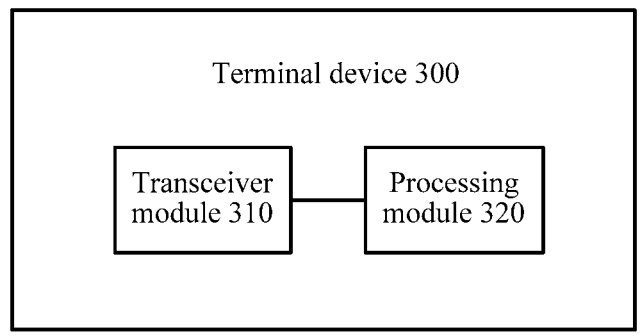
FIG. 8 is a schematic block diagram of a data transmission terminal device according to an embodiment of the present disclosure.

FIG. 8 is a schematic block diagram of a terminal device 300 according to an embodiment of the present disclosure. As shown in FIG. 8, the terminal device 300 includes:

a transceiver module 310, configured to receive first configuration information sent by a network device; and a processing module 320, configured to decode the first configuration information, where the first configuration information includes first carrier configuration information and first time configuration information, the first carrier configuration information indicates at least one carrier configured by the network device for a bearer or a logical channel for performing hybrid automatic repeat request HARQ, and the first time configuration information indicates a first transmission time unit bundling quantity corresponding to each of the at least one carrier; and the transceiver module 310 is further configured to send or receive, under control of the processing module 320, data corresponding to the bearer or the logical channel based on the first carrier configuration information and/or the first time configuration information.

In one embodiment, the transceiver module 310 is further configured to send or receive, under control of the processing module 320, different redundancy versions of the same data based on the first carrier configuration information and/or the first time configuration information.

In one embodiment, the first configuration information further includes a grant free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In one embodiment, the first configuration information further includes indication information, where the indication information is used to instruct the bearer or the logical channel to perform grant free transmission.

In one embodiment, the first configuration information further includes a modulation and coding scheme (MCS) used when grant-free transmission is performed on each carrier.

In one embodiment, the processing module 320 is further configured to select at least some carriers of the at least one carrier and transmission time unit bundling quantities corresponding to the at least some carriers based on the first configuration information.

The transceiver module 310 is further configured to send the data of the bearer or the logical channel on a transmission time unit within the transmission time unit bundling quantities corresponding to the at least some carriers.

Based on the data transmission terminal device according to this embodiment of the present disclosure, by adding the grant free transmission configuration to the first configuration information, a minimum value of a quantity of transmission time units is limited, to ensure transmission reliability, and a maximum time interval bundling quantity allowing transmission on a single carrier is limited, to ensure transmission latency.

In one embodiment, the transceiver module 310 is further configured to receive second configuration information sent by the network device. The processing module 320 is further configured to decode the second configuration information, where the second configuration information includes second carrier configuration information and/or second time configuration information, the second carrier configuration information indicates at least some carriers of the at least one carrier, the second time configuration information indicates a second transmission time unit bundling quantity corresponding to each of the at least some carriers, and the first transmission time unit bundling quantity is greater than or equal to the second transmission time unit bundling quantity. The transceiver module 310 is further configured to send or receive, under control of the processing module 320, data corresponding to the bearer or the logical channel based on the second carrier configuration information and/or the second time configuration information.

Based on the data transmission terminal device according to this embodiment of the present disclosure, the at least some carriers of the at least one carrier and the transmission time unit bundling quantity corresponding to each of the at least some carriers are indicated through the second carrier configuration information and the second time configuration information, and the network device simultaneously sends same data on transmission time units corresponding to the at least some carriers of the at least one carrier, thereby implementing low-latency and high-reliability transmission and improving resource utilization.

In one embodiment, the second configuration information further includes a grant-free transmission configuration, and the grant free transmission configuration includes a minimum value of a total quantity of transmission time units required each time grant free transmission is performed on the bearer or the logical channel and a maximum value of a bundling quantity of transmission time units allowing transmission on each carrier.

In one embodiment, the second configuration information further includes indication information, where the indication information is used to instruct the bearer or the logical channel to perform grant free transmission.

In one embodiment, the second configuration information further includes a modulation and coding scheme MCS used when grant free transmission is performed on each carrier.

In one embodiment, the second configuration information is a radio resource control RRC configuration message, downlink control information DCI, or a media access control (MAC) control element MAC CE.

In one embodiment, the transceiver module 310 is specifically configured to: send or receive, under control of the processing module 320 and based on the first configuration information, the data corresponding to the bearer or the logical channel on a subframe within the second transmission time unit bundling quantity corresponding to the at least one carrier, where the first transmission time unit bundling quantity is equal to the second transmission time unit bundling quantity.

In one embodiment, the first configuration information or the second configuration information further indicates one piece of the following information: the terminal device sends or receives a redundancy version of the data corresponding to the bearer or the logical channel on each transmission time unit of each of the at least one carrier; the terminal device sends or receives a redundancy version of the data corresponding to the bearer or the logical channel on a first transmission time unit of each of the at least one carrier; or the terminal device sends or receives a redundancy version of the data corresponding to the bearer or the logical channel on a first transmission time unit of a first carrier of the at least one carrier.

In one embodiment, if the first configuration information or the second configuration information indicates that the terminal device sends or receives the redundancy version of the data corresponding to the bearer or the logical channel on the first transmission time unit of each of the at least one carrier, the terminal device sends or receives a redundancy version of the data corresponding to the bearer or the logical channel on another transmission time unit of each of the at least one carrier cyclically based on a first predetermined rule; or if the first configuration information or the second configuration information indicates that the terminal device sends or receives the redundancy version of the data corresponding to the bearer or the logical channel on the first transmission time unit of the first carrier of the at least one carrier, the terminal device sends or receives a redundancy version of the data corresponding to the bearer or the logical channel on a first transmission time unit of another carrier of the at least one carrier cyclically based on a second predetermined rule.

In one embodiment, the data corresponding to the bearer or the logical channel is uplink data, and the transceiver module 310 is specifically configured to receive feedback information sent by the network device, where the feedback information is used to indicate a result of performing, by the network device, incremental combining on the redundancy versions of the first service.

In one embodiment, the data corresponding to the bearer or the logical channel is downlink data, and the processing module 320 is specifically configured to perform incremental combining on the redundancy versions of the data corresponding to the bearer or the logical channel.

In one embodiment, the transceiver module 310 is specifically configured to send, under control of the processing module 320, feedback information to the network device based on a result of performing incremental combining on the redundancy versions.

In one embodiment, the first configuration information further indicates: the first carrier and a first transmission time unit bundling quantity corresponding to the first carrier, where the first carrier is at least one carrier corresponding to the bearer or the logical channel in an uplink carrier set, and the uplink carrier set is used by the terminal device 300 to send uplink data; and/or a second carrier and a first transmission time unit bundling quantity corresponding to the second carrier, where the second carrier is at least one carrier corresponding to the bearer or the logical channel in a downlink carrier set, and the downlink carrier set is used by the terminal device 300 to receive downlink data.

Figure 9:
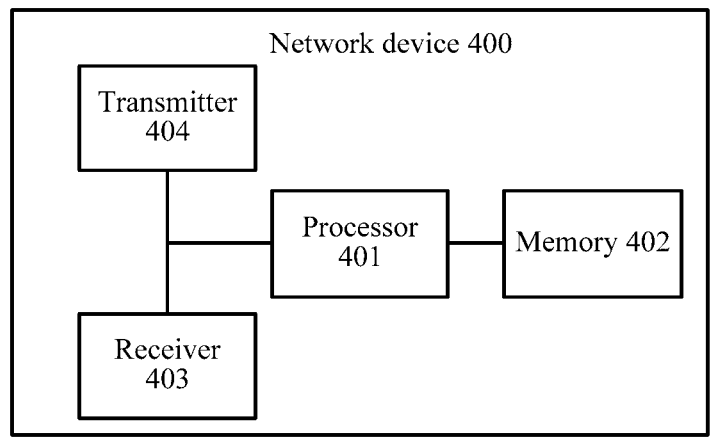
FIG. 9 is a schematic structural diagram of a data transmission network device according to an embodiment of the present disclosure.

FIG. 9 is a schematic structural diagram of a network device 400 according to an embodiment of the present disclosure. As shown in FIG. 9, the network device 400 includes a processor 401, a memory 402, a receiver 403, and a transmitter 404. These components are in communication connection with each other. The memory 402 is configured to store an instruction, and the processor 401 is configured to execute the instruction stored in the memory 402, control the receiver 403 to receive information, and control the transmitter 404 to send information.

The processor 401 is configured to execute the instruction stored in the memory 402, the processor 401 may be configured to perform a corresponding operation and/or function of the processing module 210 in the network device 200, and the receiver 403 and the transmitter 404 may be configured to perform a corresponding operation and/or function of the transceiver module 220 in the network device 200. For brevity, details are not described herein again.

Figure 10:
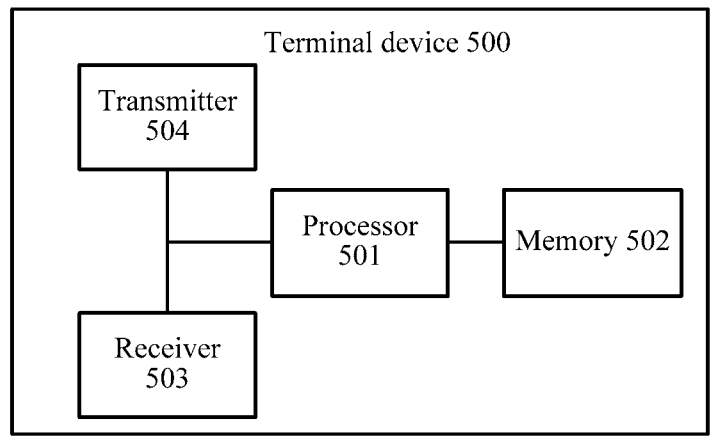
FIG. 10 is a schematic structural diagram of a data transmission terminal device according to an embodiment of the present disclosure.

FIG. 10 is a schematic structural diagram of a terminal device 500 according to an embodiment of the present disclosure. As shown in FIG. 10, the terminal device 500 includes a processor 501, a memory 502, a receiver 503, and a transmitter 504. These components are in communication connection with each other. The memory 502 is configured to store an instruction, and the processor 501 is configured to execute the instruction stored in the memory 502, control the receiver 503 to receive information, and control the transmitter 504 to send information.

The processor 501 is configured to execute the instruction stored in the memory 502, the processor 501 may be configured to perform a corresponding operation and/or function of the processing module 320 in the terminal device 300, and the receiver 503 and the transmitter 504 may be configured to perform a corresponding operation and/or function of the transceiver module 310 in the terminal device 300. For brevity, details are not described herein again.

An embodiment of the present disclosure further provides a communications system, and the communications system may include the network device 200 in FIG. 7 and the terminal device 300 in FIG. 8, or may include the network device 400 in FIG. 9 and the terminal device 500 in FIG. 10.

In the embodiments of the present disclosure, the processor may be a central processing unit (Central Processing Unit, CPU), a network processor (Network Processor, NP), or a combination of a CPU and an NP. The processor may further include a hardware chip. The hardware chip may be an application-specific integrated circuit (Application-Specific Integrated Circuit, ASIC), a programmable logic device (programmable logic device, PLD), or a combination thereof. The PLD may be a complex programmable logic device (Complex Programmable Logic Device, CPLD), a field-programmable gate array (Field-Programmable Gate Array, FPGA), a generic array logic (Generic Array Logic, GAL), or any combination thereof.

The memory may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache.

All or some of the foregoing embodiments may be implemented by means of software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic disk), an optical medium (for example, a DVD), a semiconductor medium (for example, a solid-state drive Solid State Disk (SSD), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a removable hard disk, a read-only memory, a random access memory, a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
sending, by a network device, first configuration information to a terminal device, wherein the first configuration information comprises first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and
sending or receiving, by the network device, data corresponding to the bearer or the logical channel based on the first carrier configuration information and/or the first time configuration information.

2. The method according to claim 1, wherein the sending or receiving data corresponding to the bearer or the logical channel comprises:
sending or receiving, by the network device, different redundancy versions of the same data based on the first carrier configuration information and/or the first time configuration information.

3. The method according to claim 1, wherein the first configuration information is a radio resource control (RRC) configuration message, downlink control information (DCI), or a media access control (MAC) control element (MAC CE).

4. The method according to claim 1, wherein the first configuration information further indicates a modulation and coding scheme MCS used when grant free transmission is performed on each carrier.

5. The method according to claim 1, wherein the first configuration information further comprises indication information, where the indication information indicates that grant free transmission to be performed on the bearer or the logical channel.

6. A data transmission method, comprising:
receiving, by a terminal device, first configuration information sent by a network device, wherein the first configuration information comprises first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and
sending or receiving, by the terminal device, data corresponding to the bearer or the logical channel based on the first carrier configuration information and/or the first time configuration information.

7. The method according to claim 6, wherein the sending or receiving data corresponding to the bearer or the logical channel comprises:
sending or receiving, by the terminal device, different redundancy versions of the same data based on the first carrier configuration information and/or the first time configuration information.

8. The method according to claim 6, wherein the first configuration information is a radio resource control (RRC) configuration message, downlink control information (DCI), or a media access control (MAC) control element (MAC CE).

9. The method according to claim 6, wherein the first configuration information further indicates a modulation and coding scheme MCS used when grant free transmission is performed on each carrier.

10. The method according to claim 6, wherein the first configuration information further comprises indication information, where the indication information indicates that grant free transmission to be performed on the bearer or the logical channel.

11. A network device, comprising:
a memory storage comprising instructions; and
one or more processors in communication with the memory storage, wherein the execution of the instructions by the one or more processors causes the network device to:
determine first configuration information, wherein the first configuration information comprises first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and
send the first configuration information to a terminal device; and
send or receive, under control of the processing module, data corresponding to the bearer or the logical channel based on the first carrier configuration information and/or the first time configuration information.

12. The network device according to claim 11, wherein the execution of the instructions by the one or more processors specifically causes the network device to:
send or receive different redundancy versions of the same data based on the first carrier configuration information and/or the first time configuration information.

13. The network device according to claim 11, wherein the first configuration information is a radio resource control (RRC) configuration message, downlink control information (DCI), or a media access control (MAC) control element (MAC CE).

14. The network device according to claim 11, wherein the first configuration information further indicates a modulation and coding scheme MCS used when grant free transmission is performed on each carrier.

15. The network device according to claim 11, wherein the first configuration information further comprises indication information, where the indication information indicates that grant free transmission to be performed on the bearer or the logical channel.

16. The user apparatus according to claim 11, wherein the first configuration information further indicates a modulation and coding scheme MCS used when grant free transmission is performed on each carrier.

17. The user apparatus according to claim 11, wherein the first configuration information further comprises indication information, where the indication information indicates that grant free transmission to be performed on the bearer or the logical channel.

18. A user apparatus, comprising:
a memory storage comprising instructions; and one or more processors in communication with the memory storage, wherein the execution of the instructions by the one or more processors causes the network device to:

receive first configuration information from a network device, wherein the first configuration information comprises first carrier configuration information and first time configuration information, the first carrier configuration information indicates at least one carrier configured by the network device for a bearer or a logical channel for performing hybrid automatic repeat request (HARQ), and the first time configuration information indicates a first transmission time unit bundling quantity corresponding to each of the at least one carrier; and send or receive data corresponding to the bearer or the logical channel based on the first carrier configuration information and/or the first time configuration information.

19. The user apparatus according to claim 18, wherein the execution of the instructions by the one or more processors specifically causes the user apparatus to:

send or receive different redundancy versions of the same data based on the first carrier configuration information and/or the first time configuration information.

20. The user apparatus according to claim 18, wherein the first configuration information is a radio resource control (RRC) configuration message, downlink control information (DCI), or a media access control (MAC) control element (MAC CE).

* * * * *